US012205751B2

(12) United States Patent
Yen

(10) Patent No.: US 12,205,751 B2
(45) Date of Patent: Jan. 21, 2025

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 372 days.

(21) Appl. No.: 17/662,433

(22) Filed: May 9, 2022

(65) Prior Publication Data

US 2022/0375676 A1 Nov. 24, 2022

(30) Foreign Application Priority Data

May 21, 2021 (TW) ................................ 110118540

(51) Int. Cl.
*H01H 9/28* (2006.01)
*H01F 27/28* (2006.01)
*H01F 27/29* (2006.01)
*H01F 27/40* (2006.01)

(52) U.S. Cl.
CPC ......... *H01F 27/2804* (2013.01); *H01F 27/29* (2013.01); *H01F 27/40* (2013.01)

(58) Field of Classification Search
CPC ....... H01F 27/2804; H01F 27/40; H01F 27/29
USPC .......................................................... 361/270
See application file for complete search history.

(56) References Cited

U.S. PATENT DOCUMENTS 6,577,219 B2 * 6/2003 Visser ................. H01F 27/2804 336/200
7,154,349 B2 * 12/2006 Cabanillas ........... H03B 5/1265 331/177 V
7,675,397 B2 * 3/2010 Kim .................... H01F 27/2804 336/200
2021/0074465 A1 3/2021 Yen et al.
2021/0074466 A1 3/2021 Yen et al.
2022/0059277 A1 2/2022 Yen et al.
2022/0076872 A1 3/2022 Yen et al.

* cited by examiner

*Primary Examiner* — Jared Fureman
*Assistant Examiner* — Lucy M Thomas
(74) *Attorney, Agent, or Firm* — CKC & Partners Co., LLC

(57) ABSTRACT

An inductor device includes a first trace, a second trace, and a capacitor. The first trace includes a first sub-trace and a second sub-trace. The first sub-trace and the second sub-trace form a plurality of first wires together at a first side of the inductor device, and form a plurality of second wires together at a second side of the inductor device. The second sub-trace is coupled to one terminal of the first sub-trace at a first node. The third sub-trace and the fourth sub-trace form a plurality of third wires together at the first side of the inductor device, and form a plurality of fourth wires together at the second side of the inductor device. The fourth sub-trace is coupled to one terminal of the third sub-trace at a second node. The capacitor is coupled to the first node and the second node.

19 Claims, 6 Drawing Sheets

1400

1400A

INDUCTOR DEVICE

RELATED APPLICATIONS

This application claims priority to and the benefit of Taiwan Application Serial Number 110118540, filed on May 21, 2021, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

Radio frequency (RF) devices generate second harmonic, third harmonic, etc. during operation. The harmonics cause negative effect to other circuits. For example, second harmonic of 2.4 GHz circuit is near 5 GHz, and 5 GHz signal causes negative effect to 5 GHz circuits.

Conventional way to solve negative effect caused by harmonics is that a filter will be disposed outside of a circuit for filtering the harmonics. However, the filter disposed outside of the circuit will affect function of the circuit and generates additional costs.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first trace, a second sub-trace, and a capacitor. The first trace includes a first sub-trace and a second sub-trace. The second trace includes a third sub-trace and a fourth sub-trace. The first sub-trace and the second sub-trace form a plurality of first wires together at a first side of the inductor device, and form a plurality of second wires together at a second side of the inductor device. The first sub-trace and the second sub-trace are coupled to a first node. The third sub-trace and the fourth sub-trace form a plurality of third wires together at the first side of the inductor device, and form a plurality of fourth wires together at the second side of the inductor device. The third sub-trace and the fourth sub-trace are coupled to a second node. The capacitor is coupled between the first node and the second node.

Therefore, based on the technical content of the present disclosure, the capacitor of the inductor device brings a function to filter low frequency, such that low frequency signal induced at the inductor device cannot pass but high frequency signal can pass the capacitor directly. Low frequency signal is, for example, a signal that uses 2.4 GHz as main operating frequency. An induced signal caused by the main operating frequency can be cancelled by the folded inductor of the inductor device. Therefore, the folded inductor will not affect the characteristic of the operating frequency of the inductor. If an inductor which is located at the center of the inductor device has a high frequency signal, for example, a second harmonic (e.g., 5 GHz signal), the high frequency signal may pass the capacitor and form an inductive inductor which is a circle flows through the folded inductor and the capacitor. Therefore, a 5 GHz harmonic signal corresponding to ten times of 2.4 GHz signal is induced in the inductor device of the present disclosure.

The 5 GHz signal can be used in the circuit. For example, the 5 GHz signal can be amplified and then the amplified 5 GHz signal is used to cancel the 5 GHz harmonic signal of the operating frequency. The amplifying circuit can be arranged by a designer who is familiar with circuit design. As a result, a negative effect to a 5 GHz circuit can be reduced. In addition, since the filter is disposed inside the inductor device of the present disclosure, there is no need to dispose a filter outside of the inductor device, so as to prevent an outer filter from affecting the circuit or prevent additional costs.

Furthermore, the disposition of the inductor device of the present disclosure can improve the second harmonic about 20 dB. Besides, owing to the design of the first wire to the fourth wire of the inductor device of the present disclosure, the structure of the present disclosure becomes more symmetric.

It is to be understood that both the foregoing general description and the following detailed description are by examples, and are intended to provide further explanation of the invention as claimed.

BRIEF DESCRIPTION OF THE DRAWINGS

The accompanying drawings are comprised to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall comprise plural forms of the same and plural terms shall comprise the singular. Specifically, as used herein and in the claims, the singular forms "a" and "an" comprise the plural reference unless the context clearly indicates otherwise.

Figure 1:
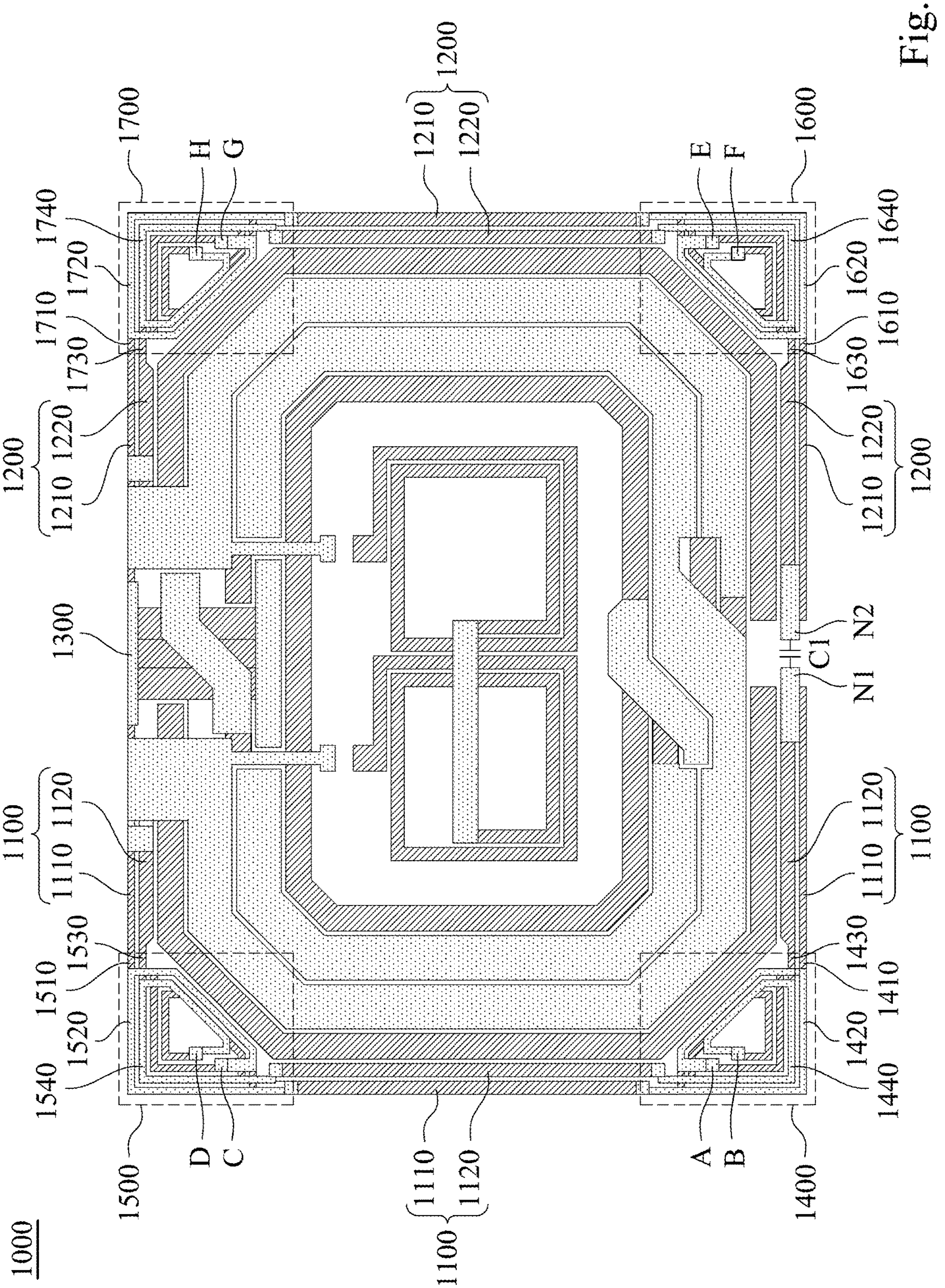
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first trace 1100, a second trace 1200, and a capacitor C. In addition, the first trace 1100 includes a first sub-trace 1110 and a second sub-trace 1120. The first sub-trace 1110 and the second sub-trace 1120 are coupled to a first node N1 at the lower terminal in the figure. Besides, the first sub-trace 1110 and the second sub-trace 1120 form a plurality of first wires 1400 together at a first side (e.g. the lower side) of the inductor device 1000, and form a plurality of second wires 1500 together at a second side (e.g. the upper side) of the inductor device 1000.

In addition, the second trace 1200 includes a third sub-trace 1210 and a fourth sub-trace 1220. The third sub-trace 1210 and the fourth sub-trace 1220 are coupled at a second node N2 at the lower terminal in the figure. Besides, the third sub-trace 1210 and the fourth sub-trace 1220 form a plurality of third wires 1600 together at the first side (e.g. the lower side) of the inductor device 1000, and form a plurality of fourth wires 1700 together at the second side (e.g. the upper side) of the inductor device 1000. In addition, the capacitor C is coupled between the first node N1 and the second node N2.

In one embodiment, the first sub-trace 1110 and the second sub-trace 1120 are all include a first terminal and a second terminal. As shown in the figure, the second terminal (e.g. the lower terminal) of the first sub-trace 1110 and the second terminal (e.g. the lower terminal) of the second sub-trace 1120 are coupled at the first node N1. For example, the first terminal of the first sub-trace 1110 is located at the upper side in the figure, and the first sub-trace 1110 is winded to the left side in the figure. Subsequently, the first sub-trace 1110 is winded to the lower side along the left side. In addition, if it reaches the lower-left side in the figure, it is winded to the node N1 in the lower side in the figure. The second terminal of the first sub-trace 1110 will be finally coupled to the node N1. With respect to the node N1, the second terminal of the second sub-trace 1120 is coupled to the node N1, and the second sub-trace 1120 is winded to the left side in the figure. Subsequently, the second sub-trace 1120 is winded to the upper side along the left side. In addition, if it reaches the upper-left side in the figure, it is winded to the connection member 1300 at the upper side in the figure, and then winded to the first terminal of the second sub-trace 1120 located at the upper side. As can be seen in the above-mentioned structure, the first sub-trace 1110 and the second sub-trace 1120 form a folded inductor.

Besides, the third sub-trace 1210 and the fourth sub-trace 1220 are all include a first terminal and a second terminal. As shown in the figure, the second terminal (e.g. the lower terminal) of the third sub-trace 1210 and the second terminal (e.g. the lower terminal) of the fourth sub-trace 1220 are coupled to the second node N2. For example, the first terminal of the third sub-trace 1210 is located at the upper side in the figure, and the third sub-trace 1210 is winded to the right side in the figure. Subsequently, the third sub-trace 1210 is winded to the lower side along the right side. In addition, if it reaches the lower-right side in the figure, it is winded to the node N2 at the lower side in the figure. The second terminal of the third sub-trace 1210 is finally coupled to the node N2. With respect to the node N2, the second terminal of the fourth sub-trace 1220 is coupled to the node N2, and the fourth sub-trace 1220 is winded to the right side in the figure. Subsequently, the fourth sub-trace 1220 is winded to the upper side along the right side. In addition, if it reaches the lower-right side in the figure, it is winded to the connection member 1300 at the upper side in the figure, and it is winded to the first terminal of the fourth sub-trace 1220 located at the upper side. Similarly, as can be seen in the above-mentioned structure, the third sub-trace 1210 and the fourth sub-trace 1220 form a folded inductor. In one embodiment, the first terminal of the third sub-trace 1210 is coupled to the first terminal of the first sub-trace 1110 through the connection member 1300.

Figure 2:
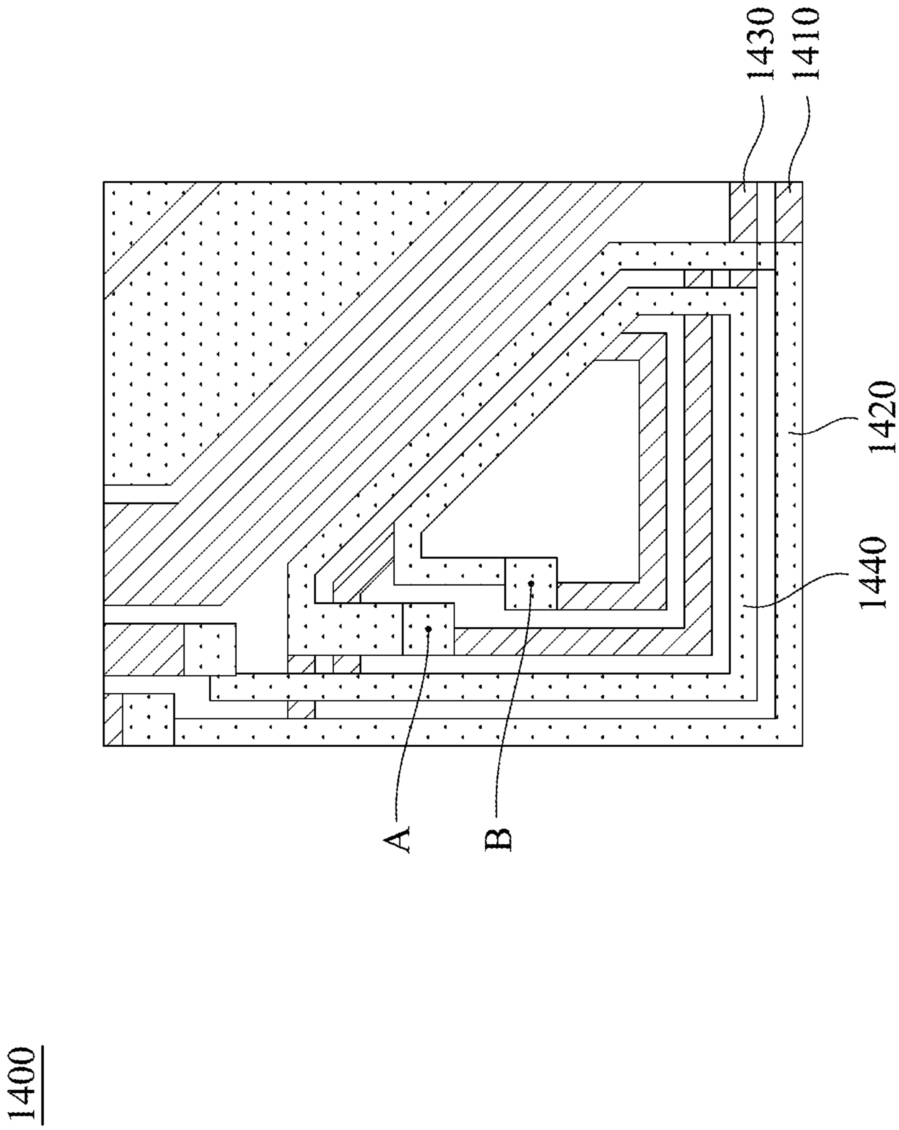
FIG. 2 depicts a schematic diagram of a partial structure of the inductor device shown in FIG. 1 according to one embodiment of the present disclosure.
Figure 3B:
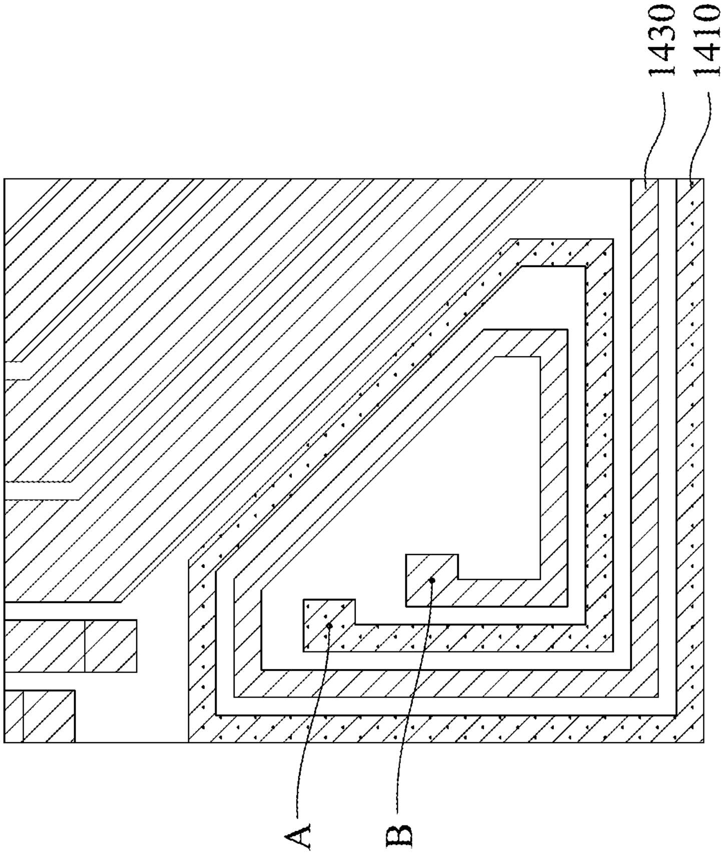
FIG. 3B depicts a schematic diagram of the first wire of the inductor device shown in FIG. 2 according to one embodiment of the present disclosure.
Figure 3A:
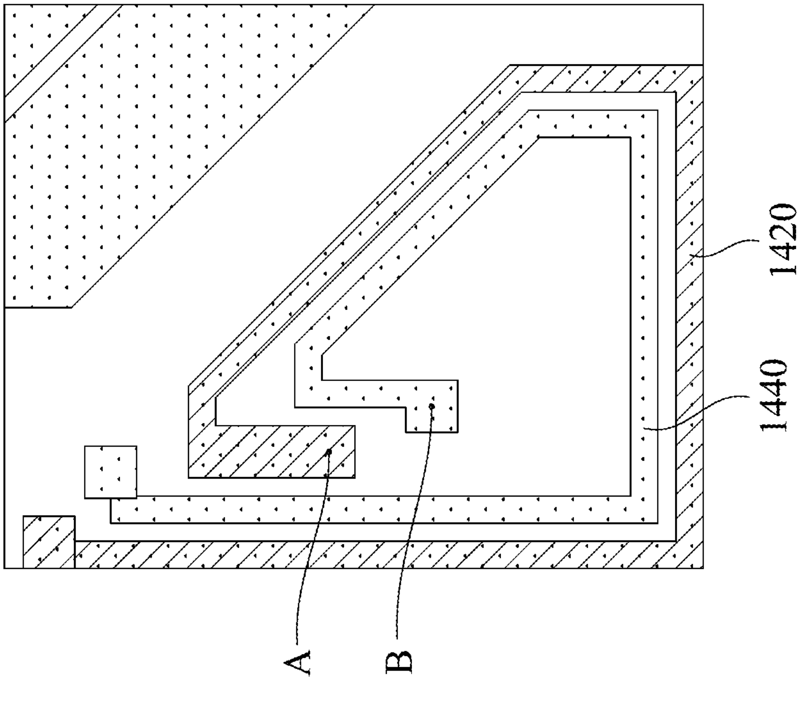
FIG. 3A depicts a schematic diagram of the first wire of the inductor device shown in FIG. 2 according to one embodiment of the present disclosure.

FIG. 2 depicts a schematic diagram of a partial structure of the inductor device 1000 shown in FIG. 1 according to one embodiment of the present disclosure. As shown in the figure, FIG. 2 illustrates the first wire 1400 of the inductor device 1000. For facilitating the understanding of the structure of the first wire 1400 in FIG. 2, reference is now made to FIG. 3A and FIG. 3B. FIG. 3A and FIG. 3B depict schematic diagrams of the first wire 1400 of the inductor device 1000 shown in FIG. 2 according to one embodiment of the present disclosure.

Referring to both FIG. 3A and FIG. 3B, the first wire 1400 includes a first sub-wire 1410 and a second sub-wire 1420. The first sub-wire 1410 is located on the first layer, and the second sub-wire 1420 is located on the second layer. Referring to FIG. 2, the second sub-wire 1420 is stacked above the first sub-wire 1410.

Referring to both FIG. 3A and FIG. 3B, the first wire 1400 further includes a third sub-wire 1430 and a fourth sub-wire 1440. The third sub-wire 1430 is located on the first layer, and the fourth sub-wire 1440 is located on the second layer. Referring to FIG. 2, the fourth sub-wire 1440 is stacked above the third sub-wire 1430.

In one embodiment, the first sub-wire 1410 is located at the outer side of the first wire 1400, and the second sub-wire 1420 is located at the outer side of the first wire 1400. The first sub-wire 1410 is coupled to second sub-wire 1420. For example, the first sub-wire 1410 and the second sub-wire 1420 are coupled at the point A.

In one embodiment, the third sub-wire 1430 is located at the inner side of the first wire 1400, and the fourth sub-wire 1440 is located at the inner side of the first wire 1400. The third sub-wire 1430 is coupled to the fourth sub-wire 1440. For example, the third sub-wire 1430 and the fourth sub-wire 1440 are coupled at the B point.

Referring to FIG. 3A, the second sub-wire 1420 and the fourth sub-wire 1440 are located on the same layer, and the fourth sub-wire 1440 is disposed at the inner side of the second sub-wire 1420. Referring to FIG. 3B, the first sub-wire 1410 and the third sub-wire 14301 are located on the same layer, and the third sub-wire 1430 is disposed inside of the first sub-wire 1410.

It is noted that, the disposition of the second wire 1500 is similar to the disposition of the first wire 1400. Referring to FIG. 1, the second wire 1500 includes a fifth sub-wire 1510 and a sixth sub-wire 1520. The fifth sub-wire 1510 is located on the first layer, and the sixth sub-wire 1520 is located on the second layer. The sixth sub-wire 1520 is stacked above the fifth sub-wire 1510.

Besides, the second wire 1500 includes a seventh sub-wire 1530 and an eighth sub-wire 1540. The seventh sub-wire 1530 is located on the first layer, and the eighth sub-wire 1540 is located on the second layer. The eighth sub-wire 1540 is stacked above the seventh sub-wire 1530.

In one embodiment, the fifth sub-wire 1510 is located at the outer side of the second wire 1500, and the sixth sub-wire 1520 is located at the outer side of the second wire 1500. The fifth sub-wire 1510 is coupled to the sixth sub-wire 1520. For example, the fifth sub-wire 1510 and the sixth sub-wire 1520 are coupled to the C point.

In one embodiment, the seventh sub-wire 1530 is located at the inner side of the second wire 1500, and the eighth sub-wire 1540 is located at the inner side of the second wire 1500. The seventh sub-wire 1530 is coupled to the eighth sub-wire 1540. For example, the seventh sub-wire 1530 and the eighth sub-wire 1540 are coupled to the D point.

In one embodiment, the fifth sub-wire 1510 and the seventh sub-wire 1530 are located on the same layer, and the seventh sub-wire 1530 is disposed inside of the fifth sub-wire 1510. Besides, the sixth sub-wire 1520 and the eighth sub-wire 1540 are located on the same layer, and the eighth sub-wire 1540 is disposed inside of the sixth sub-wire 1520.

It is noted that, the disposition of the third wire 1600 is similar to the disposition of the first wire 1400. Referring to FIG. 1, the third wire 1600 includes a ninth sub-wire 1610 and a tenth sub-wire 1620. The ninth sub-wire 1610 is located on the first layer, and the tenth sub-wire 1620 is located on the second layer. The tenth sub-wire 1620 is stacked above the ninth sub-wire 1610.

Besides, the third wire 1600 includes an eleventh sub-wire 1630 and a twelfth sub-wire 1640. The eleventh sub-wire 1630 is located on the first layer, and the twelfth sub-wire 1640 is located on the second layer. The twelfth sub-wire 1640 is stacked above the eleventh sub-wire 1630.

In one embodiment, the ninth sub-wire 1610 is located at the outer side of the third wire 1600, and the tenth sub-wire 1620 is located at the outer side of the third wire 1600. The ninth sub-wire 1610 is coupled to the tenth sub-wire 1620. For example, the ninth sub-wire 1610 and the tenth sub-wire 1620 are coupled to the E point.

In one embodiment, the eleventh sub-wire 1630 is located at the inner side of the third wire 1600, and the twelfth sub-wire 1640 is located at the inner side of the third wire 1600. The eleventh sub-wire 1630 is coupled to the twelfth sub-wire 1640. For example, the eleventh sub-wire 1630 and the twelfth sub-wire 1640 are coupled to the F point.

In one embodiment, the ninth sub-wire 1610 and the eleventh sub-wire 1630 are located on the same layer, and the eleventh sub-wire 1630 is disposed inside of the ninth sub-wire 1610. Besides, the tenth sub-wire 1620 and the twelfth sub-wire 1640 are located on the same layer, and the twelfth sub-wire 1640 is disposed inside of the tenth sub-wire 1620.

It is noted that, the disposition of the fourth wire 1700 is similar to the disposition of the first wire 1400. Referring to FIG. 1, the fourth wire 1700 includes a thirteenth sub-wire 1710 and a fourteenth sub-wire 1720. The thirteenth sub-wire 1710 is located on the first layer, and the fourteenth sub-wire 1720 is located on the second layer. The fourteenth sub-wire 1720 is stacked above the thirteenth sub-wire 1710.

Besides, the fourth wire 1700 further includes a fifteenth sub-wire 1730 and a sixteenth sub-wire 1740. The fifteenth sub-wire 1730 is located on the first layer, and the sixteenth sub-wire 1740 is located on the second layer. The sixteenth sub-wire 1740 is stacked above the fifteenth sub-wire 1730.

In one embodiment, the thirteenth sub-wire 1710 is located at the outer side of the fourth wire 1700, and the fourteenth sub-wire 1720 is located at the outer side of the fourth wire 1700. The thirteenth sub-wire 1710 is coupled to the fourteenth sub-wire 1720. For example, the thirteenth sub-wire 1710 and the fourteenth sub-wire 1720 are coupled to the G point.

In one embodiment, the fifteenth sub-wire 1730 is located at the inner side of the fourth wire 1700, and the sixteenth sub-wire 1740 is located at the inner side of the fourth wire 1700. The fifteenth sub-wire 1730 is coupled to the sixteenth sub-wire 1740. For example, the fifteenth sub-wire 1730 and the sixteenth sub-wire 1740 are coupled to the H point.

In one embodiment, the thirteenth sub-wire 1710 and the fifteenth sub-wire 1730 are located on the same layer, and the fifteenth sub-wire 1730 is disposed inside of the thirteenth sub-wire 1710. Besides, the fourteenth sub-wire 1720 and the sixteenth sub-wire 1740 are located on the same layer, and the sixteenth sub-wire 1740 is disposed inside of the fourteenth sub-wire 1720.

In one embodiment, the shape of the center structure in the inductor device 1000 can be 8-shaped, and the first wire 1400 to the fourth wire 1700 can be disposed at the upper-left side, the lower-left side, the upper-right side, and the lower-right side of the 8-shaped center structure. However, the present disclosure is not intended to be limited to the structure shown in FIG. 1, and the shape of the inductor device 1000 can be other suitable shape depending on actual requirements. In another embodiment, the first layer can be a metal layer, for example, a Metal 7. Besides, the second layer can be a Redistribution Layer (RDL). It is noted that, the present disclosure is not limited to the structure as shown in FIG. 1, FIG. 2, FIG. 3A, and FIG. 3B, and it is merely an example for illustrating one of the implements of the present disclosure.

Figure 4:
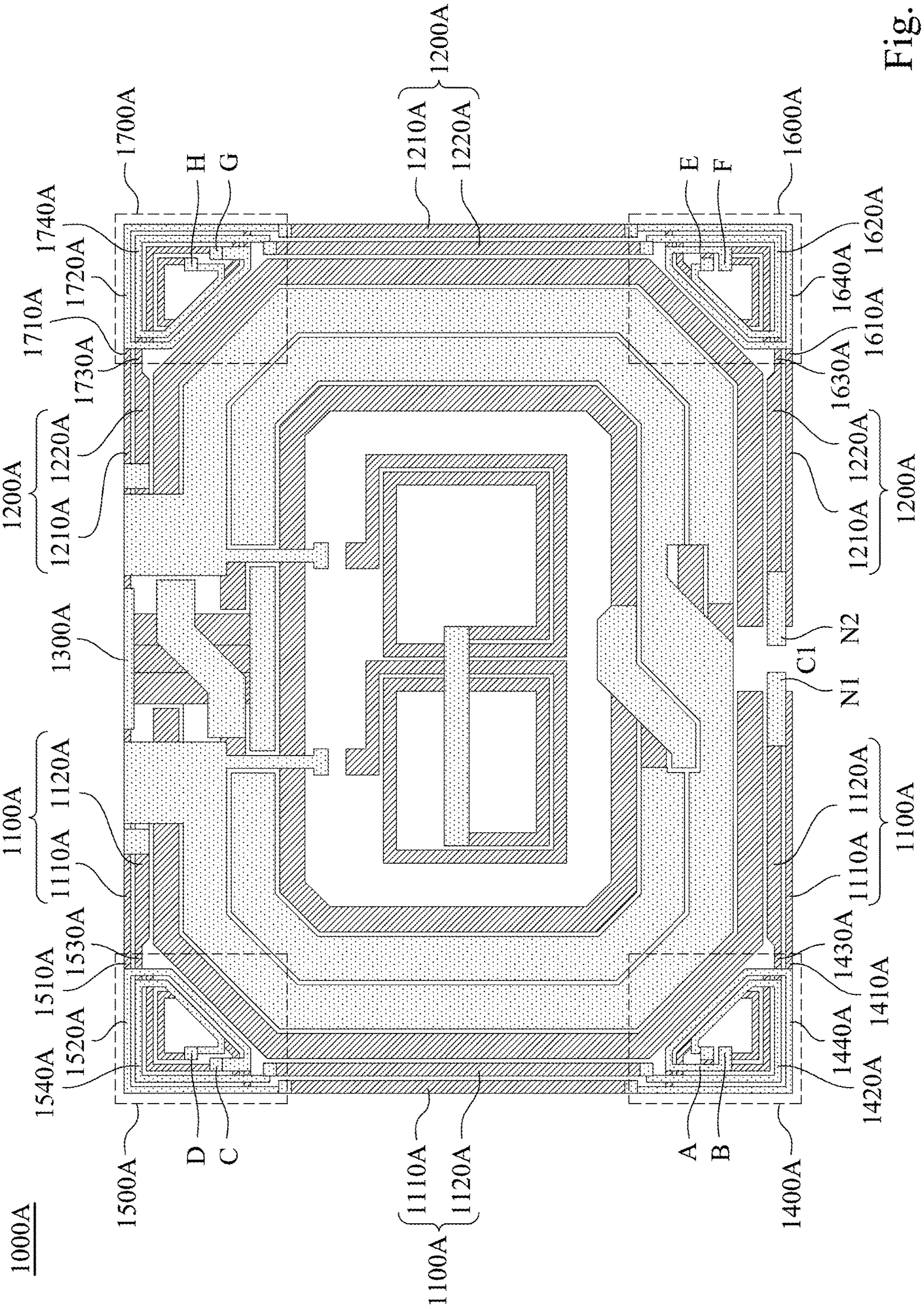
FIG. 4 depicts a schematic diagram of an inductor device according to one embodiment of the present disclosure.

FIG. 4 depicts a schematic diagram of an inductor device 1000A according to one embodiment of the present disclosure. It is noted that, the different between the inductor device 1000A of FIG. 4 and the inductor device 1000 of FIG. 1 is the disposition of the first wire 1400A to the fourth wire 1700A, which will be describe in detail as shown below.

Figure 5:
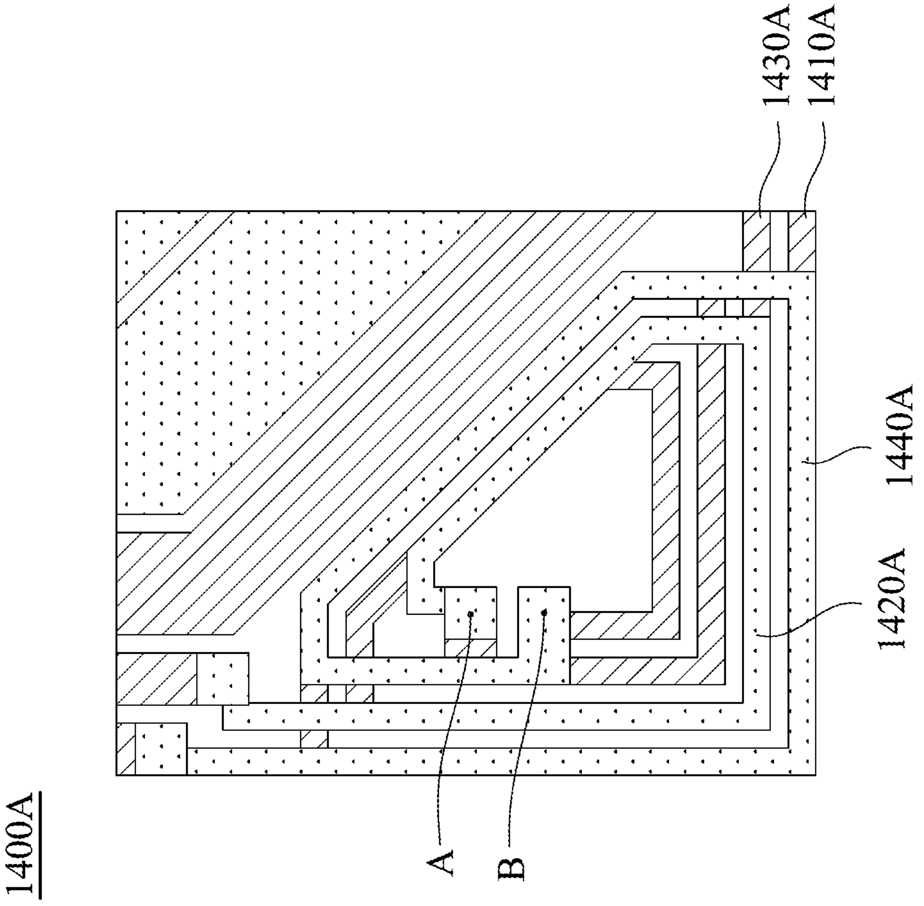
FIG. 5 depicts a schematic diagram of a partial structure of the inductor device shown in FIG. 4 according to one embodiment of the present disclosure.
Figure 6A:
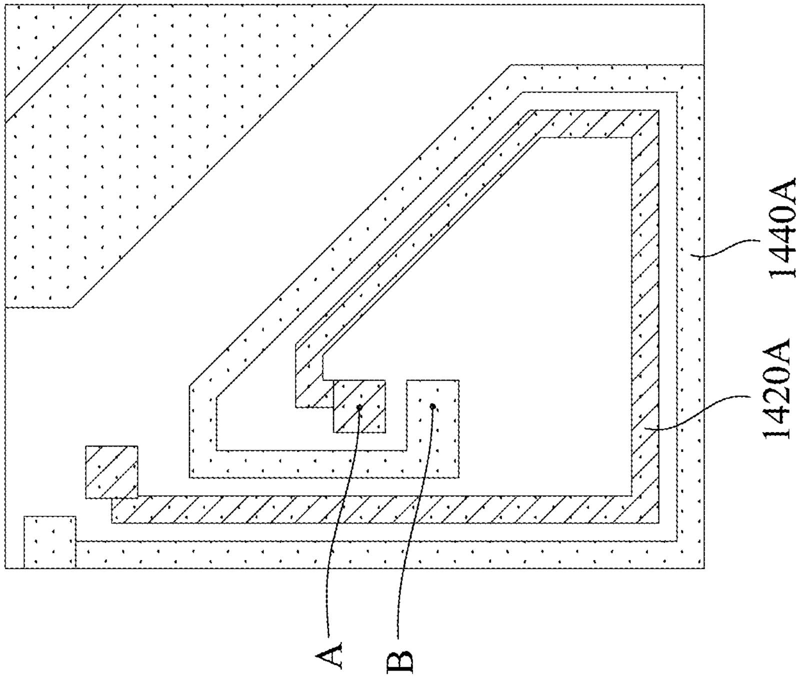
FIG. 6A depicts a schematic diagram of the first wire of the inductor device shown in FIG. 5 according to one embodiment of the present disclosure.
Figure 6B:
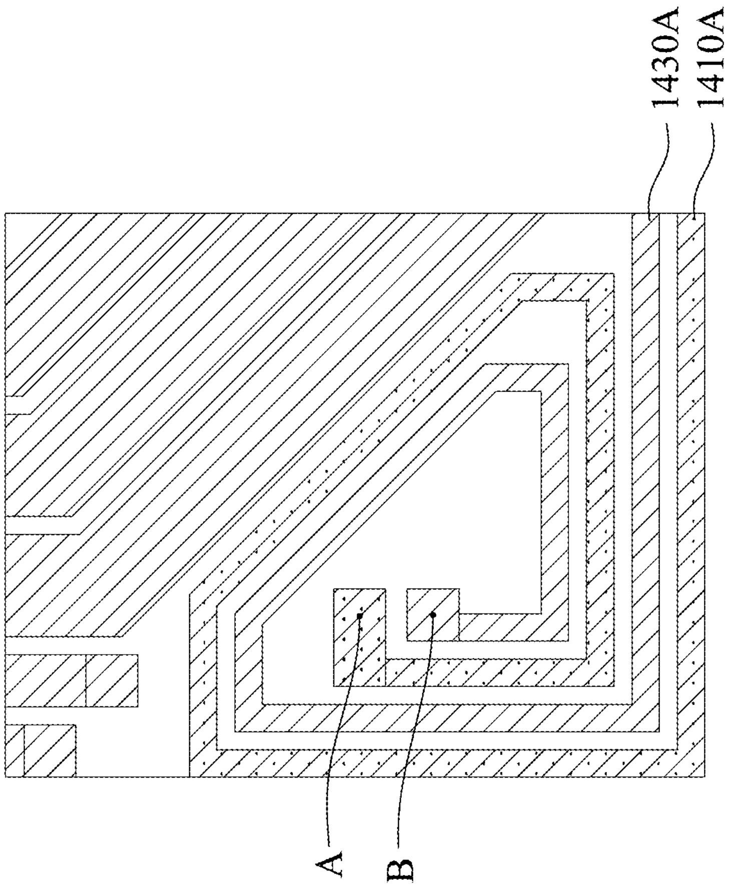
FIG. 6B depicts a schematic diagram of the first wire of the inductor device shown in FIG. 5 according to one embodiment of the present disclosure.

FIG. 5 depicts a schematic diagram of a partial structure of the inductor device 1000A shown in FIG. 4 according to one embodiment of the present disclosure. As shown in the figure, FIG. 5 illustrates the first wire 1400A of the inductor device 1000A. For facilitating the understanding of the structure of the first wire 1400A in FIG. 5, please refer to FIG. 6A and FIG. 6B. FIG. 6A and FIG. 6B depict schematic diagrams of the first wire 1400A of the inductor device shown in FIG. 5 according to one embodiment of the present disclosure.

Referring to both FIG. 6A and FIG. 6B, the first wire 1400A includes a first sub-wire 1410A and a second sub-wire 1420A. The first sub-wire 1410A is located on the first layer, and the second sub-wire 1420A is located on the second layer. Referring to FIG. 5, the second sub-wire 1420A is stacked above the first sub-wire 1410A.

Referring to both FIG. 6A and FIG. 6B, the first wire 1400A further includes a third sub-wire 1430A and a fourth sub-wire 1440A. The third sub-wire 1430A is located on the first layer, and the fourth sub-wire 1440A is located on the second layer. Referring to FIG. 5, the fourth sub-wire 1440A us stacked above the third sub-wire 1430A.

In one embodiment, the first sub-wire 1410A is located at the outer side of the first wire 1400, and the second sub-wire 1420A is located at the inner side of the first wire 1400. The first sub-wire 1410A is coupled to the second sub-wire 1420A. For example, the first sub-wire 1410A and the second sub-wire 1420A are coupled to the A point.

In one embodiment, the third sub-wire 1430A is located at the inner side of the first wire 1400A, and the fourth sub-wire 1440A is located at the outer side of the first wire 1400A. The third sub-wire 1430A is coupled to the fourth sub-wire 1440A. For example, the third sub-wire 1430A and the fourth sub-wire 1440A are coupled to the B point.

Referring to FIG. 6A, the second sub-wire 1420A and the fourth sub-wire 1440A are located on the same layer, and the second sub-wire 1420A is disposed inside of the fourth sub-wire 1440A. Referring to FIG. 6B, the first sub-wire 1410A and the third sub-wire 1430A are located on the same layer, and the third sub-wire 1430A is disposed inside of the first sub-wire 1410A. Based on the above-mentioned structure, when the first sub-wire 1410A which is located outside reaches the A point, it is connected to the second sub-wire 1420A which is located inside. The present disclosure adopts the switching design such that the structure of the present disclosure becomes more symmetric.

It is noted that, the disposition of the second wire 1500A is similar to the disposition of the first wire 1400A. Referring to FIG. 4, the second wire 1500A includes a fifth sub-wire 1510A and a sixth sub-wire 1520A. The fifth sub-wire 1510A is located on the first layer, and the sixth sub-wire 1520A is located on the second layer. The sixth sub-wire 1520A is stacked above the fifth sub-wire 1510A.

Besides, the second wire 1500A includes a seventh sub-wire 1530A and an eighth sub-wire 1540A. The seventh sub-wire 1530A is located on the first layer, and the eighth sub-wire 1540A is located on the second layer. The eighth sub-wire 1540A is stacked above the seventh sub-wire 1530A.

In one embodiment, the fifth sub-wire 1510A is located at the outer side of the second wire 1500A, and the sixth sub-wire 1520A is located at the outer side of the second wire 1500A. The fifth sub-wire 1510A is coupled to the sixth sub-wire 1520A. For example, the fifth sub-wire 1510A and the sixth sub-wire 1520A are coupled to the C point.

In one embodiment, the seventh sub-wire 1530A is located at the inner side of the second wire 1500A, and the eighth sub-wire 1540A is located at the inner side of the second wire 1500A. The seventh sub-wire 1530A is coupled to the eighth sub-wire 1540A. For example, the seventh sub-wire 1530A and the eighth sub-wire 1540A are coupled to the D point.

In one embodiment, the fifth sub-wire 1510A and the seventh sub-wire 1530A are located on the same layer, and the seventh sub-wire 1530A is disposed inside of the fifth sub-wire 1510A. Besides, the sixth sub-wire 1520A and the eighth sub-wire 1540A are located on the same layer, and the sixth sub-wire 1520A is disposed inside of the eighth sub-wire 1540A.

It is noted that, the disposition of the third wire 1600A is similar to the disposition of the first wire 1400A. Referring to FIG. 4, the third wire 1600A includes a ninth sub-wire 1610A and a tenth sub-wire 1620A. The ninth sub-wire 1610A is located on the first layer, and the tenth sub-wire 1620A is located on the second layer. The tenth sub-wire 1620A is stacked above the ninth sub-wire 1610A.

Besides, the third wire 1600A includes an eleventh sub-wire 1630A and a twelfth sub-wire 1640A. The eleventh sub-wire 1630A is located on the first layer, and the twelfth sub-wire 1640A is located on the second layer. The twelfth sub-wire 1640A is stacked above the eleventh sub-wire 1630A.

In one embodiment, the ninth sub-wire 1610A is located at the outer side of the third wire 1600A, and the tenth sub-wire 1620A is located at the inner side of the third wire 1600A. The ninth sub-wire 1610A is coupled to the tenth sub-wire 1620A. For example, the ninth sub-wire 1610A and the tenth sub-wire 1620A is coupled to the E point.

In one embodiment, the eleventh sub-wire 1630A is located at the inner side of the third wire 1600A, and the twelfth sub-wire 1640A is located at the outer side of the third wire 1600A. The eleventh sub-wire 1630A is coupled to the twelfth sub-wire 1640A. For example, the eleventh sub-wire 1630A and the twelfth sub-wire 1640A are coupled to the F point.

In one embodiment, the ninth sub-wire 1610A and the eleventh sub-wire 1630A are located on the same layer, and the eleventh sub-wire 1630A is disposed inside of the ninth sub-wire 1610A. Besides, the tenth sub-wire 1620A and the twelfth sub-wire 1640A are located on the same layer, and the tenth sub-wire 1620A is disposed inside of the twelfth sub-wire 1640A. Based on the above-mentioned structure, when the ninth sub-wire 1610A which is located outside reaches the E point, it is connected to the tenth sub-wire 1620A which is located inside. The present disclosure adopts the switching design such that the structure of the present disclosure becomes more symmetric.

It is noted that, the disposition of the fourth wire 1700A is similar to the disposition of the first wire 1400A. Referring to FIG. 4, the fourth wire 1700A includes a thirteenth sub-wire 1710A and a fourteenth sub-wire 1720A. The thirteenth sub-wire 1710A is located on the first layer, and the fourteenth sub-wire 1720A is located on the second layer. The fourteenth sub-wire 1720A is stacked above the thirteenth sub-wire 1710A.

Besides, the fourth wire 1700A further includes a fifteenth sub-wire 1730A and a sixteenth sub-wire 1740A. The fifteenth sub-wire 1730A is located on the first layer, and the sixteenth sub-wire 1740A is located on the second layer. The sixteenth sub-wire 1740A is stacked above the fifteenth sub-wire 1730A.

In one embodiment, the thirteenth sub-wire 1710A is located at the outer side of the fourth wire 1700A, and the fourteenth sub-wire 1720A is located at the outer side of the fourth wire 1700A. The thirteenth sub-wire 1710A is coupled to the fourteenth sub-wire 1720A. For example, the thirteenth sub-wire 1710A and the fourteenth sub-wire 1720A are coupled to the G point.

In one embodiment, the fifteenth sub-wire 1730A is located at the inner side of the fourth wire 1700A, and the sixteenth sub-wire 1740A is located at the inner side of the fourth wire 1700A. The fifteenth sub-wire 1730A is coupled to the sixteenth sub-wire 1740A. For example, the fifteenth sub-wire 1730A and the sixteenth sub-wire 1740A are coupled to the H point.

In one embodiment, the thirteenth sub-wire 1710A and the fifteenth sub-wire 1730A are located on the same layer, and the fifteenth sub-wire 1730A is disposed inside of the thirteenth sub-wire 1710A. Besides, the fourteenth sub-wire 1720A and the sixteenth sub-wire 1740A are located on the same layer, and the fourteenth sub-wire 1720A is disposed inside of the sixteenth sub-wire 1740A.

It is noted that, the present disclosure is not limited to the structure as shown in FIG. 4, FIG. 5, FIG. 6A, and FIG. 6B, and it is merely an example for illustrating one of the implements of the present disclosure.

It can be understood from the embodiments of the present disclosure that application of the present disclosure has the following advantages. The inductor device of the present disclosure may induce high frequency signal (e.g., second harmonic) of inductor inside the inductor device. After the high frequency signal is amplified by additional circuit, the amplified high frequency signal is able to cancel negative effect to the circuit caused by second harmonic. For example, the capacitor of the inductor device is used to let high frequency signal pass and block low frequency signal. Therefore, the inductor device is able to deal with signals in high frequency or low frequency by two kinds of inducing manner. In addition, since the filter is disposed inside integrated circuit (IC), for example, the inductor device, of the present disclosure, there is no need to dispose a filter outside of the inductor device, so as to prevent an outer filter from affecting the circuit or prevent additional costs.

Furthermore, the disposition of the inductor device of the present disclosure can improve the second harmonic about 20 dB. Besides, owing to the design of the first wire to the fourth wire of the inductor device of the present disclosure, the structure of the present disclosure becomes more symmetric.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:
a first trace, comprising:
a first sub-trace; and
a second sub-trace, wherein the first sub-trace and the second sub-trace form a plurality of first wires together at a first side of the inductor device, and form a plurality of second wires together at a second side of the inductor device, wherein the first sub-trace and the second sub-trace are coupled to a first node;
a second trace, comprising:
a third sub-trace; and
a fourth sub-trace, wherein the third sub-trace and the fourth sub-trace form a plurality of third wires together at the first side of the inductor device, and form a plurality of fourth wires together at the second side of the inductor device, wherein the third sub-trace and the fourth sub-trace are coupled to a second node; and
a capacitor, coupled between the first node and the second node,
wherein the first wires comprise:
a first sub-wire, located on a first layer; and
a second sub-wire, located on a second layer, and stacked above the first sub-wire.

2. The inductor device of claim 1, wherein the first sub-trace comprises:
a first terminal; and
a second terminal;
wherein the second sub-trace comprises:
a first terminal; and
a second terminal, coupled to the second terminal of the first sub-trace at the first node.

3. The inductor device of claim 2, wherein the third sub-trace comprises:
a first terminal; and
a second terminal;
wherein the fourth sub-trace comprises:
a first terminal; and
a second terminal, coupled to the second terminal of the third sub-trace at the second node.

4. The inductor device of claim 3, further comprising:
a connection member, coupled to the first terminal of the first sub-trace and the first terminal of the third sub-trace.

5. The inductor device of claim 1, wherein the first wires further comprise:
a third sub-wire, located on the first layer; and
a fourth sub-wire, located on the second layer, and stacked above the third sub-wire.

6. The inductor device of claim 5, wherein the first sub-wire is located at an outer side of the first wires, and the second sub-wire is located at the outer side of the first wires, wherein the first sub-wire is coupled to the second sub-wire, wherein the third sub-wire is located at an inner side of the first wires, and the fourth sub-wire is located at the inner side of the first wires, wherein the third sub-wire is coupled to the fourth sub-wire.

7. The inductor device of claim 6, wherein the second wires comprise:
a fifth sub-wire, located on the first layer;
a sixth sub-wire, located on the second layer, and stacked above the fifth sub-wire;
a seventh sub-wire, located on the first layer; and
an eighth sub-wire, located on the second layer, and stacked above the seventh sub-wire.

8. The inductor device of claim 7, wherein the fifth sub-wire is located at an outer side of the second wires, and the sixth sub-wire is located at the outer side of the second wires, wherein the fifth sub-wire is coupled to the sixth sub-wire, wherein the seventh sub-wire is located at an inner side of the second wires, and the eighth sub-wire is located at the inner side of the second wires, wherein the seventh sub-wire is coupled to the eighth sub-wire.

9. The inductor device of claim 5, wherein the first sub-wire is located at an outer side of the first wires, and the second sub-wire is located at an inner side of the first wires, wherein the first sub-wire is coupled to the second sub-wire, wherein the third sub-wire is located at the inner side of the first wires, and the fourth sub-wire is located at the outer side of the first wires, wherein the third sub-wire is coupled to the fourth sub-wire.

10. The inductor device of claim 9, wherein the second wires further comprise:

a fifth sub-wire, located on the first layer;

a sixth sub-wire, located on the second layer, and stacked above the fifth sub-wire;

a seventh sub-wire, located on the first layer; and an eighth sub-wire, located on the second layer, and stacked above the seventh sub-wire.

11. The inductor device of claim 10, wherein the fifth sub-wire is located at an outer side of the second wires, and the sixth sub-wire is located at the outer side of the second wires, wherein the fifth sub-wire is coupled to the sixth sub-wire, wherein the seventh sub-wire is located at an inner side of the second wires, and the eighth sub-wire is located at the inner side of the second wires, wherein the seventh sub-wire is coupled to the eighth sub-wire.

12. The inductor device of claim 10, wherein the third wires comprise:

a ninth sub-wire, located on the first layer; and a tenth sub-wire, located on the second layer, and stacked above the ninth sub-wire.

13. The inductor device of claim 12, wherein the third wires further comprise:

an eleventh sub-wire, located on the first layer; and a twelfth sub-wire, located on the second layer, and stacked above the eleventh sub-wire.

14. The inductor device of claim 13, wherein the ninth sub-wire is located at an outer side of the third wires, and the tenth sub-wire is located the the outer side of the third wires, wherein the ninth sub-wire is coupled to the tenth sub-wire, wherein the eleventh sub-wire is located at an inner side of the third wires, and the twelfth sub-wire is located at the inner side of the third wires, wherein the eleventh sub-wire is coupled to the twelfth sub-wire.

15. The inductor device of claim 14, wherein the fourth wires comprise:

a thirteenth sub-wire, located on the first layer;

a fourteenth sub-wire, located on the second layer, and stacked above the thirteenth sub-wire;

a fifteenth sub-wire, located on the first layer; and a sixteenth sub-wire, located on the second layer, and stacked above the fifteenth sub-wire.

16. The inductor device of claim 15, wherein the thirteenth sub-wire is located at an outer side of the fourth wires, and the fourteenth sub-wire is located at the outer side of the fourth wires, wherein the thirteenth sub-wire is coupled to the fourteenth sub-wire, wherein the fifteenth sub-wire is located at an inner side of the fourth wires, and the sixteenth sub-wire is located at the inner side of the fourth wires, wherein the fifteenth sub-wire is coupled to the sixteenth sub-wire.

17. The inductor device of claim 13, wherein the ninth sub-wire is located at an outer side of the third wires, and the tenth sub-wire is located at an inner side of the third wires, wherein the ninth sub-wire is coupled to the tenth sub-wire, wherein the eleventh sub-wire is located at the inner side of the third wires, and the twelfth sub-wire is located at the outer side of the third wires, wherein the eleventh sub-wire is coupled to the twelfth sub-wire.

18. The inductor device of claim 17, wherein the fourth wires further comprise:

a thirteenth sub-wire, located on the first layer;

a fourteenth sub-wire, located on the second layer, and stacked above the thirteenth sub-wire;

a fifteenth sub-wire, located on the first layer; and a sixteenth sub-wire, located on the second layer, and stacked above the fifteenth sub-wire.

19. The inductor device of claim 18, wherein the thirteenth sub-wire is located at an outer side of the fourth wires, and the fourteenth sub-wire is located at the outer side of the fourth wires, wherein the thirteenth sub-wire is coupled to the fourteenth sub-wire, wherein the fifteenth sub-wire is located at an inner side of the fourth wires, and the sixteenth sub-wire is located at the inner side of the fourth wires, wherein the fifteenth sub-wire is coupled to the sixteenth sub-wire.

* * * * *